Jan. 24, 1939.  M. DE FALCO  2,144,964
APERIODIC OSCILLATING COUPLING JOINT WITH CONSTANT TRANSMISSION RATIO
Filed Sept. 3, 1937  2 Sheets-Sheet 1
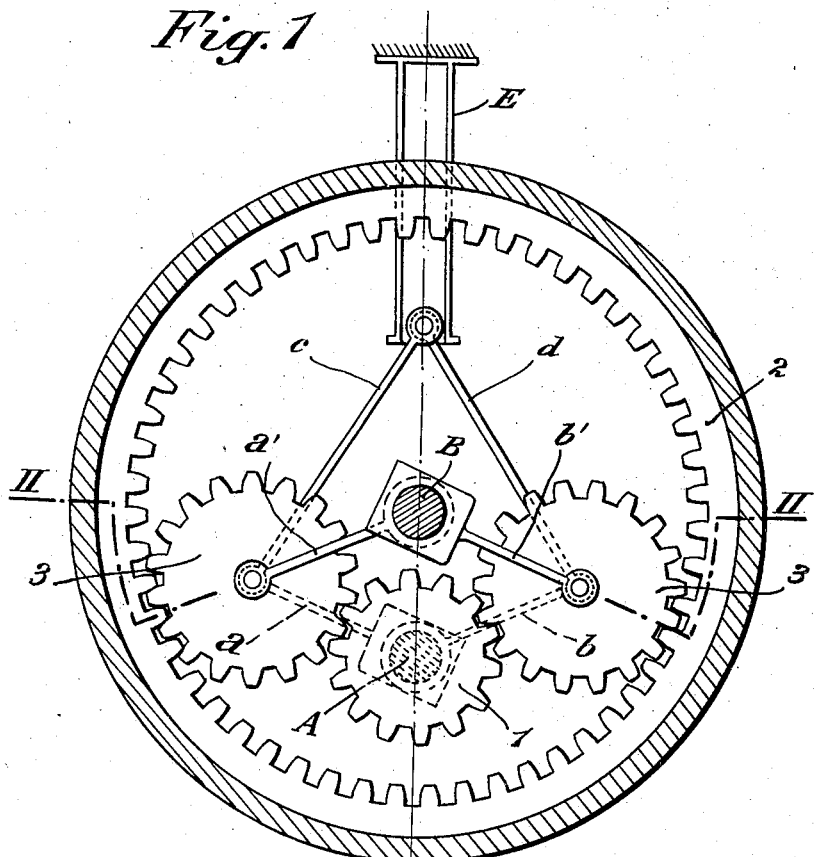
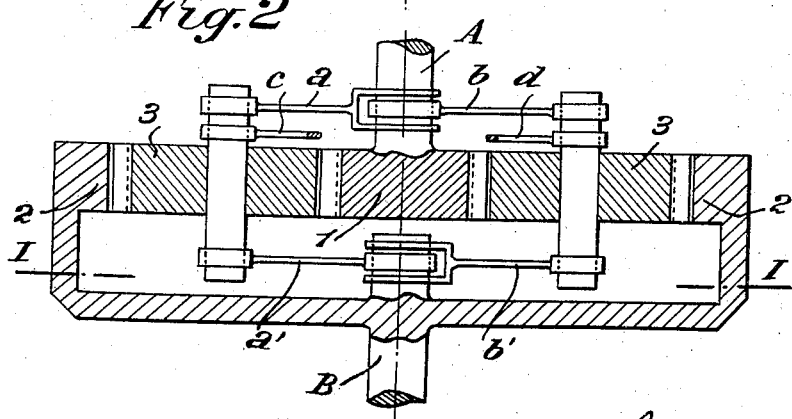

Patented Jan. 24, 1939

2,144,964

UNITED STATES PATENT OFFICE 2,144,964

APERIODIC OSCILLATING COUPLING JOINT WITH CONSTANT TRANSMISSION RATIO

Mario de Falco, Rome, Italy

Application September 3, 1937, Serial No. 162,372
In Italy April 16, 1937

5 Claims. (Cl. 74—394)

The object of the present invention is to provide a joint for coupling two parallel shafts, permitting transmission of couple solely through gears the connection between which is secured by a system of hinged members exclusively provided for the purpose, this coupling permitting variation of distance between the driving and driven shafts with a constant gear ratio.

By way of illustrative, not limitative example a form of realization of the improved coupling is shown in the annexed drawings, in which:

Fig. 1 is a section on line I—I of Fig. 2,

Fig. 2 is a section on line II—II of Figs. 1 and 3, and

Figure 3:
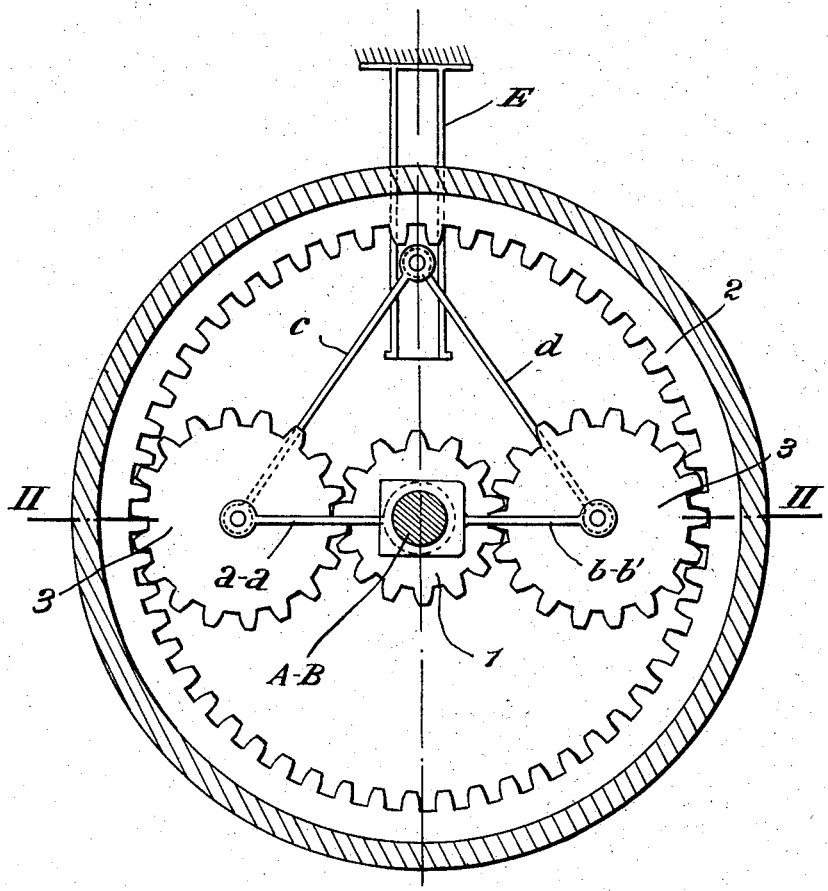

Fig. 3 a view similar to Fig. 1 with the members in another position.

In these drawings, A is the driving and B the driven shaft. As is seen from the drawings, the mechanism comprises a central pinion 1 integral with shaft A, and transmitting the movement to a gear with internal toothing 2 integral with the driven shaft B by intermediate planetary pinions 3. The latter are constantly kept in contact with pinion 1 and the internally toothed gear 2 through a hinged parallelogram system comprising levers $a$, $b$, $a'$, $b'$ which, on the one hand, keeps constant the distance between the axis of pinion 1 and the axes of planetary pinions 3, and on the other hand the distance between the axis of the internally toothed gear 2 and the axes of pinions 3.

The axes of the planetary pinions, furthermore, are connected to a couple of connecting-rods $c$ $d$. Their ends opposed to the axes of the pinions are hinged together and may slide in a guideway E which determines the direction of the oscillations.

The operation of the above described mechanism is the following:

When the two shafts in rotation, A and B, keep a constant distance from axis to axis, the couple is transmitted from one shaft to the other through gearing with a gear ratio determined by said gearing, without there being any oscillation of the lever system $a$, $b$, $a'$, $b'$.

When, as a consequence of external oscillation, the distance from axis to axis of the shafts changes, the parallelogram system is deformed producing by this deformation the contact between the various gearings, the couple always being transmitted exclusively through the above said gearings.

It is obvious that the levers $a$, $b$, $a'$, $b'$, and the connecting-rods $c$ $d$ may be replaced by equivalent members having the only purpose of keeping engaged the various gearings of the coupling joint.

On the other hand it is evident that the above described example of realization of coupling is only illustrative, not limitative, of invention, and that the structural details of the improved coupling may be modified by any practical means within the scope of the invention.

Having now particularly described and ascertained the nature of my said invention and in what manner the same is to be performed, I declare that what I claim is:

1. An aperiodical drive transmitting coupling between two parallel and reciprocally eccentric shafts having variable eccentricity comprising a gear on one shaft, a gear on the other shaft, a pair of pinions meshing with each of said gears and a hinged parallelogram linkage connecting said gears and pinions.

2. An aperiodical drive transmitting coupling between two parallel and reciprocally eccentric shafts having variable eccentricity comprising a gear on one shaft, a gear on the other shaft, a pair of pinions meshing with each of said gears, a hinged parallelogram linkage connecting said gears and pinions, and means controlling the direction of displacement of one shaft with relation to the other.

3. An aperiodical drive transmitting coupling between two parallel and reciprocally eccentric shafts having variable eccentricity comprising a gear on one shaft, a gear on the other shaft, a pair of pinions meshing with each of said gears, a hinged parallelogram linkage connecting said gears and pinions, a guideway, connecting rods pivoted to the axes of said pinions at one of their ends and with their free ends guided by said guideway so as to control the displacements of one shaft with relation to the other.

4. An aperiodical drive transmitting coupling between two parallel and reciprocally eccentric shafts having variable eccentricity comprising a gear on one shaft, a gear on the other shaft, a pair of pinions meshing with each of said gears and a hinged parallelogram linkage connecting said gears and pinions and said gears and pinions being disposed in the same plane.

5. A coupling as claimed in claim 1 in which one of said gears is an internally toothed gear.

MARIO DE FALCO.